United States Patent
Muranaka

(10) Patent No.: US 7,575,093 B2
(45) Date of Patent: Aug. 18, 2009

(54) VEHICLE STEERING CONTROL SYSTEM

(75) Inventor: Hidefumi Muranaka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 50 days.

(21) Appl. No.: 11/808,720

(22) Filed: Jun. 12, 2007

(65) Prior Publication Data
US 2007/0284181 A1    Dec. 13, 2007

(30) Foreign Application Priority Data
Jun. 13, 2006   (JP)   ............... 2006-163934

(51) Int. Cl.
*B62D 5/04* (2006.01)
(52) U.S. Cl. ............... 180/446; 180/443; 180/444; 701/41
(58) Field of Classification Search ........... 180/443, 180/444, 446; 701/41, 42
See application file for complete search history.

(56) References Cited

U.S. PATENT DOCUMENTS
2005/0236894 A1 * 10/2005  Lu et al. ................. 303/139

FOREIGN PATENT DOCUMENTS
JP         2004-168166        6/2004

* cited by examiner

*Primary Examiner*—Paul N Dickson
*Assistant Examiner*—Marc A Scharich
(74) *Attorney, Agent, or Firm*—Smith, Gambrell & Russell, LLP

(57) ABSTRACT

A vehicle steering control system is provided which can appropriately control a steering angle and provide sufficient braking force even when the brake pedal is fully pressed down during cornering thereby causing wheels to lock. When it is determined that the ABS is active during cornering while braking and the vehicle is not traveling in the intended cornering direction, a steering control section computes a front wheel steering angle correction amount for correcting the front wheel steering angle, and added in the intended cornering direction so as to set front wheels in a vehicle traveling direction.

14 Claims, 3 Drawing Sheets

VEHICLE STEERING CONTROL SYSTEM

CROSS REFERENCE TO RELATED APPLICATIONS

The disclosures of Japanese Applications No. 2006-163934 filed on Jun. 13, 2006 including the specification, drawings, and abstract are incorporated herein by references in its entirety.

BACKGROUND OF THE INVENTION

1. Technical Field

The present invention relates to a vehicle steering control system which employs an electric motor or the like to provide an additional front wheel steering angle to a front wheel steering angle operated by a vehicle operator.

2. Related Art

Conventionally, various techniques have been suggested which are employed to correct a front wheel steering angle operated by a vehicle operator. For example, a steering control system is disclosed in Japanese Patent Application Laid-Open No. 2004-168166, which employs variable steering gear ratios. This steering control system is configured to determine the steering gear ratio based on the sum of a proportional term dependent on the steering angle and a differential term dependent on the steering angular speed. The system is also configured to change the differential term from the positive region to the negative region as the vehicle speed is increased.

The conventional steering control system as disclosed in Japanese Patent Application Laid-Open No. 2004-168166 mentioned above is intended to improve actual steering in response to a steering input from the vehicle operator. However, the system is not configured to counteract various situations, which may occur during vehicle operator's maneuvers, to properly maintain the steering angle. For example, the vehicle operator may press the brake pedal fully during cornering, thereby causing a wheel to lock. In such a situation, the vehicle will not be able to travel in the intended cornering direction and thus the vehicle operator may further steer the vehicle. In such a case, the system can not provide proper braking force.

SUMMARY OF THE INVENTION

The present invention has been developed in view of the aforementioned problems. It is therefore an object of the present invention to provide a vehicle steering control system which can appropriately control the steering angle and provide sufficient braking force even in such a situation where the brake pedal is fully pressed during cornering thereby causing a wheel to lock.

The present invention as the first aspect provides a vehicle steering control system a front wheel steering angle detector for detecting a front wheel steering angle operated by a vehicle operator, a wheel lock state detector for detecting whether a wheel is locked or not, an under-steer condition detector for detecting whether the vehicle in an under-steer condition or not, front wheel steering angle correcting means for computing a front wheel steering angle correction amount to be added to the input front wheel steering angle, and a front wheel steering angle correcting mechanism for correcting a front wheel steering angle based on the front wheel steering angle correction amount, wherein the front wheel steering angle correcting means computing the front wheel steering angle correction amount so to set front wheels in a vehicle traveling direction when wheel locked status and under-steer status are detected.

The second aspect of this invention according to the first aspect, the locking of the wheels is detected based on the activation of an anti-lock brake system.

The third aspect of this invention according to the first aspect, the front wheel steering angle correction amount is computed based on an actual yaw rate of the vehicle so that the wheels is in a vehicle traveling direction from current direction.

The vehicle steering control system according to the present invention can appropriately control the steering angle and provide sufficient braking force even in such a situation where the brake pedal is fully pressed down during cornering thereby causing wheels to lock.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Now, the present invention will be described below in more detail with reference to the accompanying drawings in accordance with an embodiment thereof.

Figure 1:
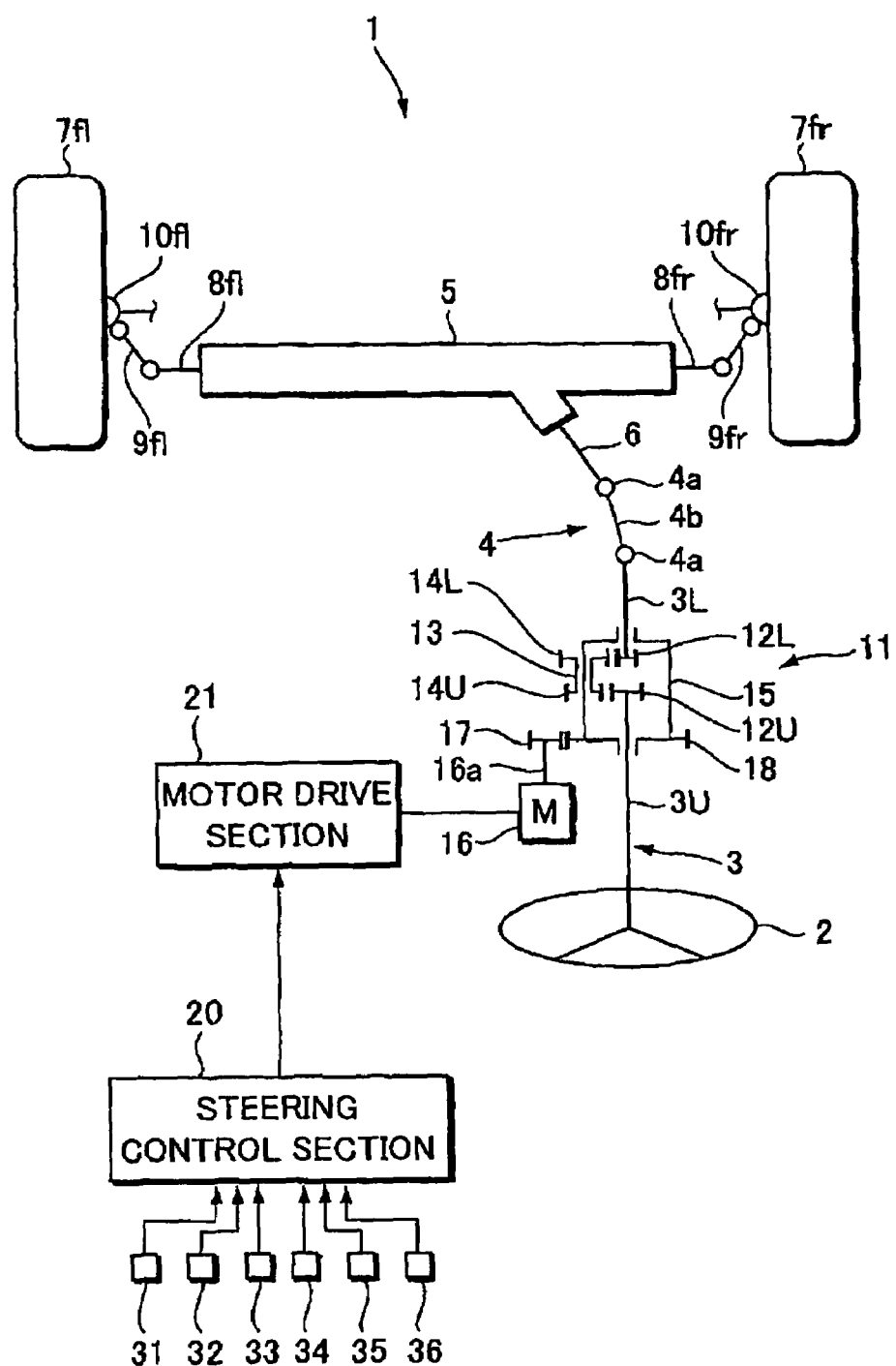
FIG. 1 is an explanatory view schematically illustrating the configuration of a vehicle front wheel steering system.

With reference to FIG. 1, the reference numeral 1 denotes a vehicle front wheel steering system. In the front wheel steering system 1, a steering wheel 2 has a steering shaft 3 extending therefrom, and the front end of the steering shaft 3 is coupled via a joint section 4 of universal joints 4a, 4a and a joint shaft 4b to a pinion shaft 6 protruding from a steering gear box 5.

The steering gear box 5 has a tie rod 8fl extending toward a left front wheel 7fl and a tie rod 8fr extending toward a right front wheel 7fr.

The tie rod ends of the tie rods 8fl and 8fr are coupled via knuckle arms 9fl and 9fr to axle housings 10fl and 10fr which rotatably support the wheels 7fl and 7fr, respectively.

At a midpoint of the steering shaft 3, there is interposed a front wheel steering angle correcting mechanism 11 for varying steering gear ratios. The steering shaft 3 has an upper shaft 3U or a shaft section extending upwardly from the front wheel steering angle correcting mechanism 11 and a lower shaft 3L or a shaft section extending downwardly from the front wheel steering angle correcting mechanism 11.

A description will now be made hereinafter to the configuration of the front wheel steering angle correcting mechanism 11. The lower end of the upper shaft 3U and the upper end of the lower shaft 3L are securely provided with a pair of sun gears 12U and 12L on the same rotational axis center, respectively. The pair of sun gears 12U and 12L are engaged with planetary gears 14U and 14L which are securely provided on multiple (e.g., three) pinion shafts 13, respectively.

The pair of sun gears 12U and 12L are both stored inside a carrier 15 for rotatably supporting the pinion shafts 13. On the outer circumference of the upper end of the carrier 15, a driven gear 18 is provided to engage a driving gear 17 which is securely provided on an output shaft 16a of an electric motor 16.

The electric motor 16 is driven by a motor drive section 21, and the motor drive section 21 is designed to rotate the electric motor 16 based on a signal corresponding to an input motor rotation angle from a steering control section 20, which serves as front wheel steering angle correcting means.

The vehicle includes a vehicle speed sensor 31 for detecting a vehicle speed V, and a steering wheel angle sensor 32 for detecting a steering angle θHd determined by a vehicle operator. The vehicle also includes an actual-steering angle sensor 33 for detecting a front wheel actual-steering angle δf (=δHd+δHc) which is finally determined by a steering angle δHd that is derived from both a steering angle δHc provided by the front wheel steering angle correcting mechanism 11 and the steering angle θHd provided by the vehicle operator. The vehicle further includes a yaw rate sensor 34 for detecting an actual yaw rate γ. Signals from these sensors 31, 32, 33, and 34 are supplied to the steering control section 20.

The vehicle is also provided with a brake switch 35 for detecting the ON/OFF state of the brake pedal being pressed or released by the vehicle operator. This ON/OFF signal is also supplied to the steering control section 20.

On the vehicle, further mounted is a well-known anti-lock brake system (ABS) 36 for preventing a wheel from locking while braking. A signal indicative of the operation of the ABS 36 is also supplied to the steering control section 20.

Thus, in accordance with each of the aforementioned input signals, the steering control section 20 follows a steering control program, discussed later, to deliver a signal indicative of a motor rotation angle ΘM to the motor drive section 21. In this program, appropriate control can be provided to the steering angle to ensure sufficient braking force even in a situation where the operator steers the vehicle as well as fully presses down the brake pedal during cornering thereby causing a wheel to lock.

Figure 2:
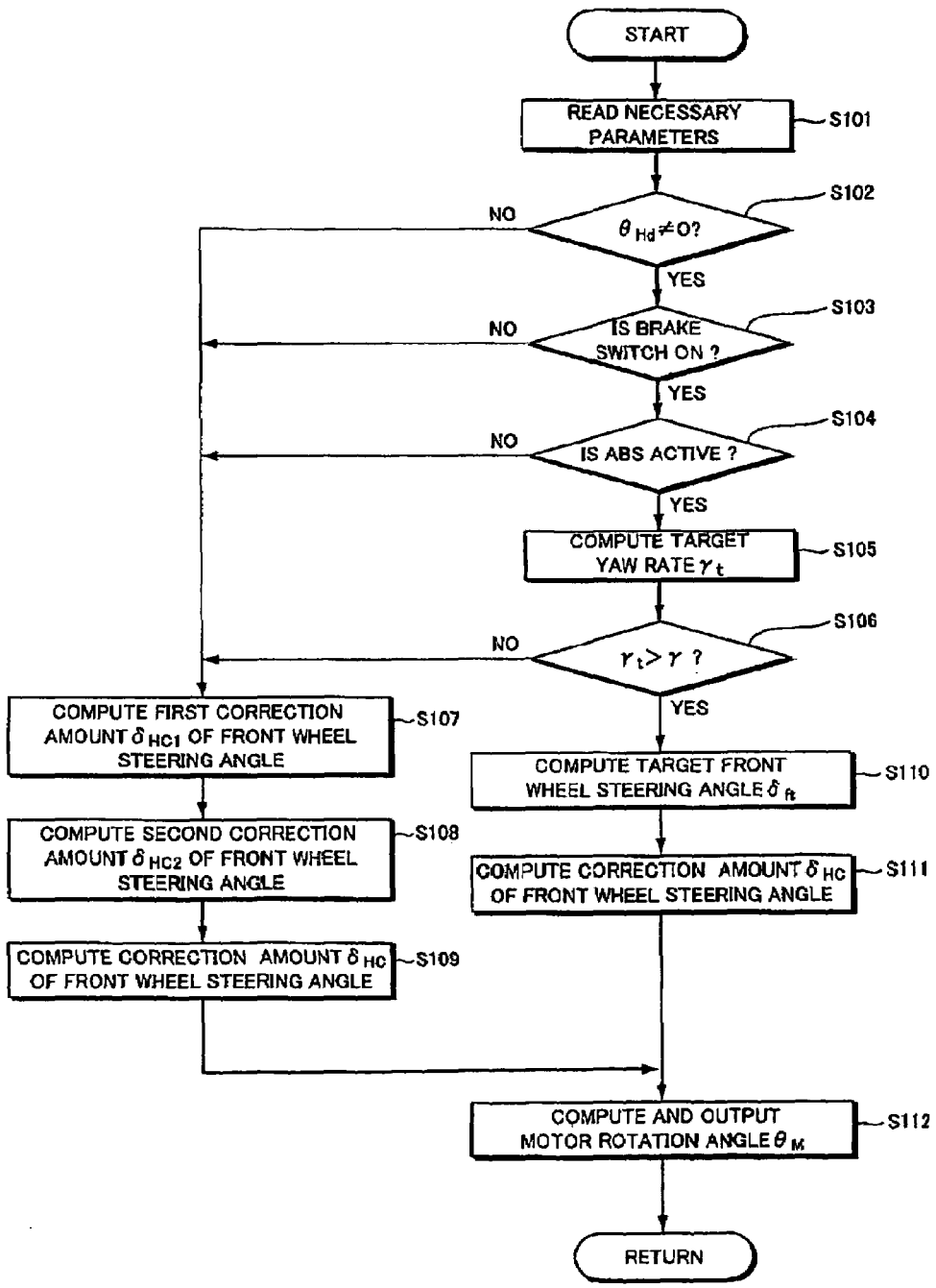
FIG. 2 is a flowchart showing a steering control program.

A description will now be made hereinafter to the steering control program with reference to the flowchart of FIG. 2.

To begin with, in step (hereinafter simply referred to as "S") 101, the process acquires necessary parameters, i.e., the vehicle speed V, the steering angle θHd determined by the vehicle operator, the front wheel actual-steering angle δf, the actual yaw rate γ, the brake switch ON/OFF signal, and the signal indicative of the operation of the ABS 36.

Then, the process proceeds to S102, where it is determined whether the operator is steering the vehicle, i.e., whether θHd is not equal to 0. Consequently, if ΘHd is not equal to 0, the process determines that a cornering operation is being carried out. Then, the process proceeds to S103, where it is determined whether the brake switch 35 is in an ON state or the brake pedal is in a braking operation.

As a result of the determination in S103, if the brake switch 35 is ON, the process proceeds to S104, in which when the ABS 36 is in operation, it proceeds to S105, where a target yaw rate γt is computed, for example, by Equation (1) below in accordance with the equation of motion of the vehicle.

$$\gamma t = G(0) \cdot (1/(1+Tr \cdot s)) \cdot \delta f \quad (1)$$

where G(0) is the yaw rate steady-state gain, Tr is the time constant, and s is the Laplace operator. For example, the time constant Tr can be determined by Equation (2) below, and the yaw rate steady-state gain G(0) can be determined by Equation (3) below.

$$Tr = (m \cdot Lf \cdot V)/(2 \cdot L \cdot kre) \quad (2)$$

where m is the mass of the vehicle, Lf is the distance between the front shaft and the center of gravity, L is the wheel base, and kre is the rear equivalent cornering power.

$$G(0) = 1/(1+sf \cdot V2) \cdot V/L \quad (3)$$

where sf is the stability factor that is determined by various specifications of the vehicle, and computed, for example, by Equation (4) below.

$$sf = -m/(2 \cdot L^2) \cdot (Lf \cdot kfe - Lr \cdot kre)/(kfe \cdot kre) \quad (4)$$

where kfe is the front equivalent cornering power, and Lr is the distance between the rear shaft and the center of gravity.

Then, the process proceeds to S106, where it is determined whether the target yaw rate γt is greater than the actual yaw rate γ (γt>γ).

It may hold true that θHd=0 (not in a cornering operation) in S102, the brake switch 35 is OFF (not in a braking operation) in S103, the ABS is inactive (not in a locked state) in S104, or γt≦γ (not in an understeer tendency) in S106. In any one of these conditions, the process proceeds to the normal front wheel steering angle correcting process in S107 to S109.

Figure 3:
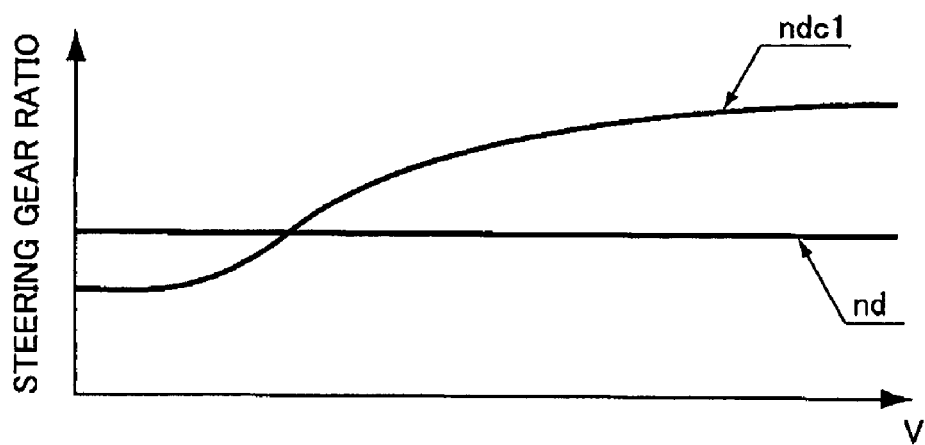
FIG. 3 is a characteristic diagram of vehicle speed responsive steering gear ratios.

In S107, for example, a first front wheel steering angle correction amount δHc1 is computed by Equation (5) below.

$$\delta Hc1 = ((\theta Hd/ndc1) - (\theta Hd/nd)) \cdot nc \quad (5)$$

where nd is the operator-side steering gear ratio (which affects the operator's handling when the electric motor 16 is stopped, or which is determined by the pair of sun gears 12U and 12L, the pair of planetary gears 14U and 14L, and the steering gear box 5). Additionally, nc is the steering gear ratio on the front wheel steering angle correcting mechanism 11 side (which comes into effect when the electric motor 16 is rotated while the operator is carrying out no handling, or which is determined by the driving gear 17 and the driven gear (carrier) 18). Furthermore, ndc1 is the vehicle speed responsive steering gear ratio that is obtained from a pre-set map or operation expression. For example, the vehicle speed responsive steering gear ratio ndc1 is set as shown in FIG. 3, i.e., determined to have a quicker characteristic relative to the operator-side steering gear ratio nd at low vehicle speed V, while having a slower characteristic relative to the operator-side steering gear ratio nd at higher vehicle speed V.

Then, the process proceeds to S108, where the process computes a second front wheel steering angle correction amount δHc2, e.g., by Equation (6) below.

$$\delta Hc2 = Gcd \cdot (1/(1+Tcd \cdot S)) \cdot (d\theta Hd/dt)/nd \quad (6)$$

where Gcd is the control gain, Tcd is the time constant of a low-pass filter, S is the Laplace operator, and (dθHd/dt) is the differential value of the front wheel steering angle.

Accordingly, Equation (6) above indicates that the differential value (dθHd/dt) of the front wheel steering angle is multiplied by (1/(1+Tcd·S)), thereby performing low-pass filtering. The time constant Tcd of the low-pass filter is set, for example, at 1 to 2 Hz which is the resonant frequency of a yaw rate response for an input front wheel steering angle.

Figure 4:
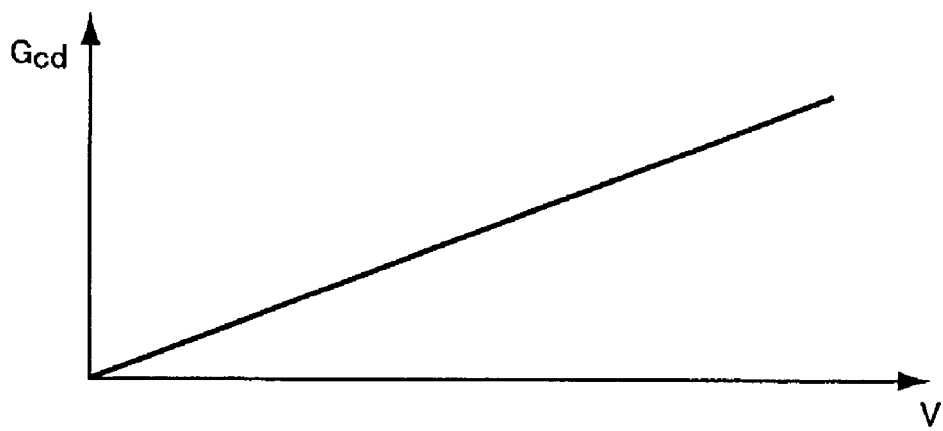
FIG. 4 is a characteristic diagram of control gains.

Furthermore, the control gain Gcd is designed to have a higher setting at higher vehicle speed V, with reference to the map or the like as shown in FIG. 4. This is because such a characteristic as having an abrupt peak for a steering frequency becomes more noticeable as the vehicle speed V increases.

Then, the process proceeds to S109, where the first front wheel steering angle correction amount δHc1 computed in S107 and the second front wheel steering angle correction amount δHc2 computed in S108 are used to set the front wheel steering angle correction amount δHc by Equation (7) below.

$$\delta Hc = \delta Hc1 + \delta Hc2 \quad (7)$$

On the other hand, the process may determine in S106 that the target yaw rate γt is greater than the actual yaw rate γ(γt>γ) and the vehicle tends to be understeered (i.e., the ABS is active during cornering while braking and the vehicle is not traveling in the intended direction). In this case, the process proceeds to S110, where a target front wheel steering angle δft is computed by Equation (9) below.

As the premise of Equation (9), Equation (1) above is modified as follows.

$$\delta f = (1/G(0)) \cdot \gamma t + (Tr/G(0)) \cdot s \cdot \gamma t \quad (8)$$

where s·γt is the differential value of γt. Replacing δf with the target front wheel steering angle δft and γt with the actual yaw rate γ will give Equation (9) below.

$$\delta ft = (1/G(0)) \cdot \gamma + (Tr/G(0)) \cdot (d\gamma/dt) \quad (9)$$

Then, the process proceeds to S111, where the front wheel steering angle correction amount δHc is computed by Equation (10) below based on the target front wheel steering angle δft computed in S110.

$$\delta Hc = \delta ft - (\theta Hd/nd) \quad (10)$$

After the front wheel steering angle correction amount δHc has been computed in S109 or in S111, the process proceeds to S112, where the motor rotation angle θM is then computed by Equation (11) below and delivered to the motor drive section 21. Then, the process exits the program.

$$\theta M = \delta Hc \cdot nc \quad (11)$$

As described above, according to the embodiment of the present invention, the steering control section 20 is adapted to provide a front wheel steering angle correction amount for the vehicle to travel in the intended cornering direction in such a situation where the operator presses the brake pedal fully during cornering thereby causing a wheel to lock. This allows the tires to make full use of their grip force for braking, thereby making it possible to shorten vehicle's braking distances.

What is claimed is:

1. A vehicle steering control system, comprising
   a front wheel steering angle detector for detecting an input front wheel steering angle operated by a vehicle operator;
   a wheel lock state detector for detecting whether a wheel is locked or not;
   an under-steer condition detector for detecting whether said vehicle is in an under-steer condition or not;
   a front wheel steering angle correction amount calculator for computing a front wheel steering angle correction amount to be added to said input front wheel steering angle; and
   a front wheel steering angle correcting mechanism for correcting a front wheel actual steering angle based on said front wheel steering angle correction amount,
   wherein said front wheel steering angle correcting mechanism corrects said front wheel actual steering angle using the front wheel steering angle correction amount in a vehicle cornering direction when the wheel is locked and the vehicle is in an under-steer condition.

2. The vehicle steering control system according to claim 1, wherein the locking of the wheels is detected based on the activation of an anti-lock brake system.

3. The vehicle steering control system according to claim 1, wherein said front wheel steering angle correction amount is computed based on an actual yaw rate of the vehicle.

4. The vehicle steering control system according to claim 1, wherein said front wheel steering angle correction amount is computed based on an actual yaw rate of the vehicle and the input front wheel steering angle.

5. The vehicle steering control system according to claim 1, wherein said front wheel steering angle correction amount is computed based on an equation of motion for the vehicle involving the actual yaw rate of the vehicle as a parameter.

6. The vehicle steering control system according to claim 1, wherein said front wheel steering angle correction amount is a difference between a target front wheel steering angle and a converted front wheel steering angle by the vehicle operator, wherein said target front wheel steering angle is calculated based on an equation of motion for the vehicle involving the actual yaw rate of the vehicle as a parameter.

7. The vehicle steering control system according to claim 6, wherein said converted front wheel steering angle by the vehicle operator is based on a ratio of θHd/nd; wherein $\theta_{Hd}$ represents said front wheel steering angle by the vehicle operator and nd represents an operator side steering gear ratio.

8. The vehicle steering control system according to claim 1, wherein said front wheel steering angle correcting mechanism comprises:
   a drive source, and
   a planetary gear set drivingly connecting to two inputs and an output, wherein one of said inputs drivingly connects to the drive source, the other of said inputs drivingly connects to a steering wheel of the vehicle, and said output drivingly connects to the front wheel, and wherein said front wheel steering angle correcting mechanism corrects the front wheel actual steering angle by an output power of the drive source.

9. The vehicle steering control system according to claim 8, wherein the drive source is an electric motor.

10. The vehicle steering control system according to claim 1, wherein said front wheel steering angle correcting mechanism corrects the front wheel actual steering angle by using an additional input in a separate way from the input front wheel steering angle operated by a vehicle operator.

11. The vehicle steering control system according to claim 1, wherein the wheel lock state detector detects locking of the wheels based on a sensing of a braking signal.

12. The vehicle steering control system according to claim 11, wherein the wheel lock state detector further detects for an activation of an anti-lock brake system.

13. The vehicle steering control system according to claim 1, further comprising a steering control section device which receives detection information from each of said front wheel steering angle detector, wheel lock state detector, and under-steer condition detector.

14. The vehicle steering control system according to claim 13, wherein said under-steer condition detector receives input from a vehicle speed sensor, an actual steering angle sensor and an actual yaw rate sensor.

* * * * *